Oct. 11, 1960 P. GOIRAND 2,955,544
CONTINUOUS TRAVEL TELPHERS OF THE MONOCABLE (OR BICABLE)
TYPE, WITH AUTOMATIC COUPLING TO THE TRACTION CABLE
Filed Nov. 22, 1955 2 Sheets-Sheet 1
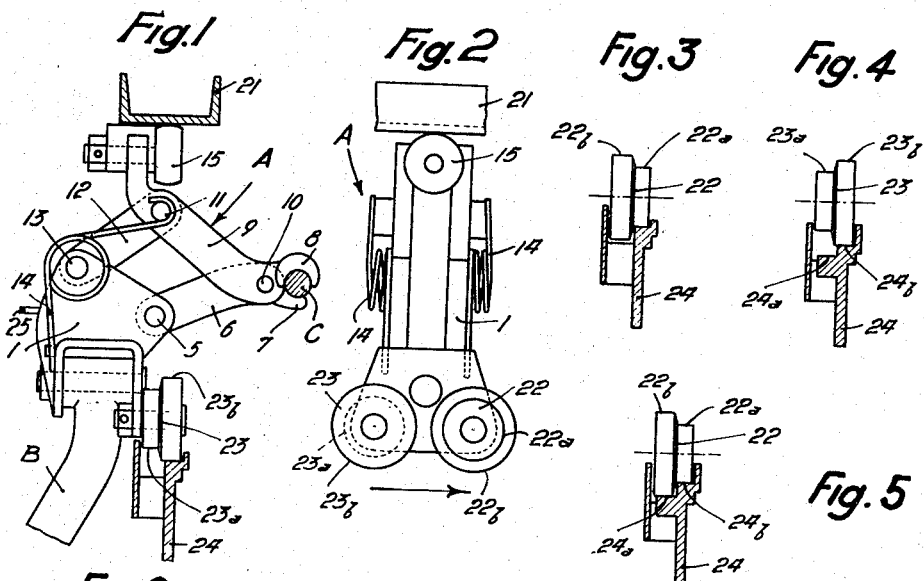
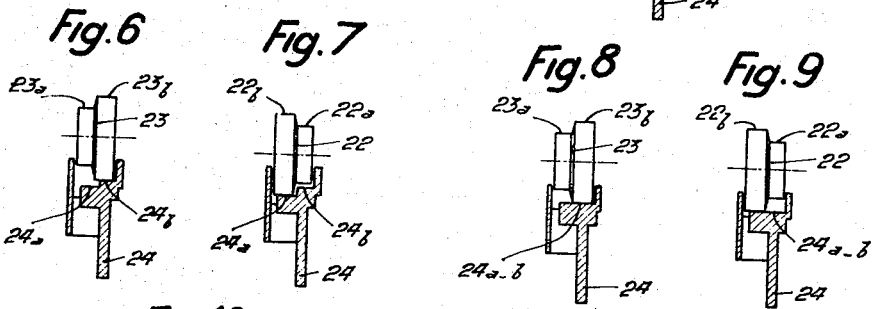
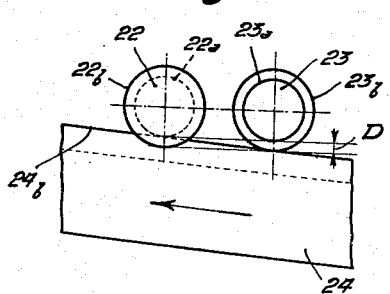
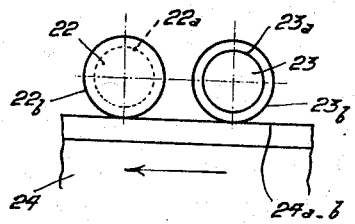
Pierre Goirand
by Oct. 11, 1960
P. GOIRAND
2,955,544
CONTINUOUS TRAVEL TELPHERS OF THE MONOCABLE (OR BICABLE) TYPE, WITH AUTOMATIC COUPLING TO THE TRACTION CABLE
Filed Nov. 22, 1955
2 Sheets-Sheet 2
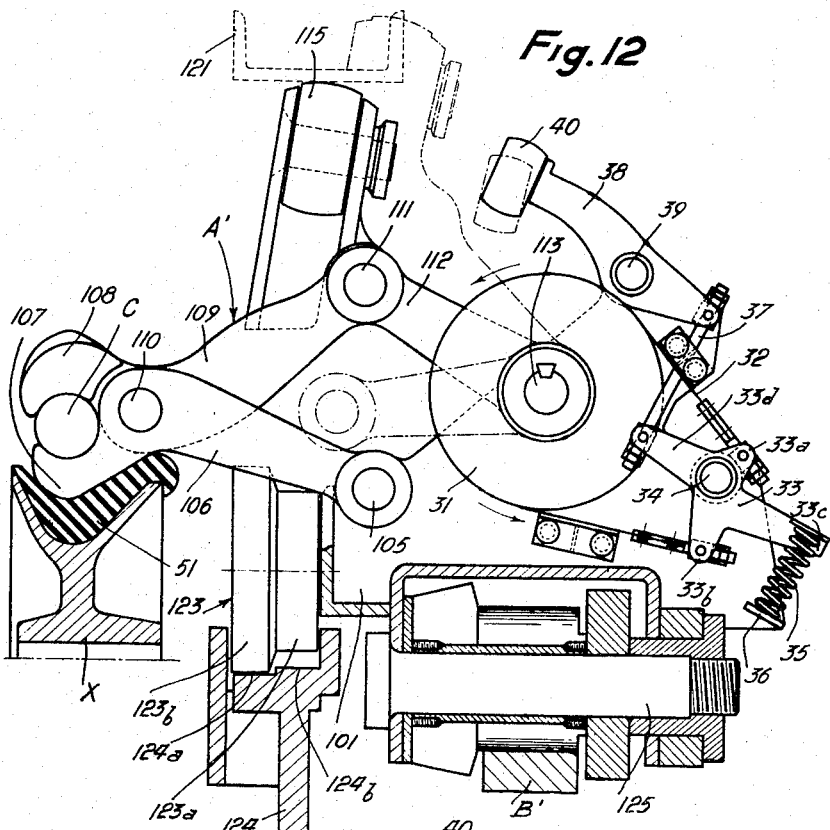
Fig.12
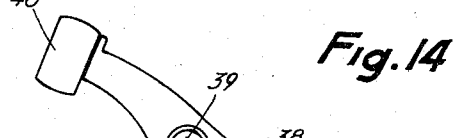
Fig.14
Fig.13
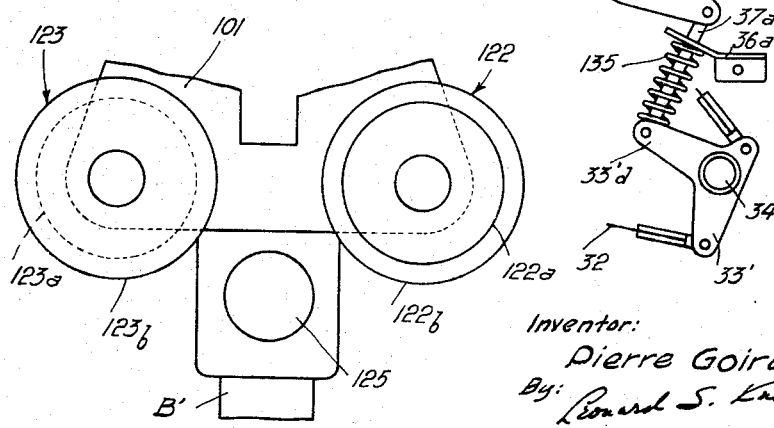
Inventor:
Pierre Goirand
By: Leonard S. Knox
His Attorney

2,955,544

CONTINUOUS TRAVEL TELPHERS OF THE MONOCABLE (OR BICABLE) TYPE, WITH AUTOMATIC COUPLING TO THE TRACTION CABLE

Pierre Goirand, 2 Boulevard Agutte-Sembat, Grenoble, France

Filed Nov. 22, 1955, Ser. No. 548,517

Claims priority, application France Nov. 23, 1954

4 Claims. (Cl. 104—178)

This invention relates to continuous travel telphers of the monocable (or bicable) type with automatic coupling device to the traction cable, and it has for its subject matter some improvements in this type of aerial transport tackle, the purpose of the said improvements being, in particular, to ensure greater safety in operation.

It is well known that transport tackle of this type comprise a carrier from which the load to be transported is suspended and which, by means of a coupling mechanism mounted thereon and usually called a "clip," can be made integral with a cable (which is both bearer and traction cable), the said clip being made to close and grip tightly on the cable by the weight of the carrier and the load.

Automatic closure of the clip on the cable and its opening (which disconnects the carrier from the cable) are ensured, at stations for instance, by a check rail acting on a wheel, a shoe, etc. carried on the clip of the carrier, which also has one or two carrier wheels resting on a bearing rail at the said stations.

Now, at the points where the bearing rail takes up the carrier wheels or at the points where the said wheels leave the rail, the latter forms, in a vertical plane, a certain angle with the cable so that, in the zone where the carrier wheels come into contact or cease to be in contact with the bearing rail, the whole of the carrier unit slopes in relation to the cable which is thus more or less roughly hand led by the carrier coupling clip which, as a whole, follows the movements of the carrier.

Moreover, when it is desired to have the cable enter or leave the jaws of the clip which has already been opened (movement which is called coupling and uncoupling), this movement is greatly hampered by the sloping position of the jaws in relation to the cable.

In a known tackle, a single running wheel is used, which enables the carrier to select its angular position (slope) itself; this system, however, does not solve the problem because the position of the carrier remains indeterminate and unstable, and this gives rise to considerable lack of reliability in the coupling and uncoupling workings.

In order to obviate this drawback and according to the invention, the wheels of the carrier provided with a clip for the coupling to the traction cable are so placed and arranged as to cooperate with separate bearing surfaces which, in turn, are so arranged that the carrier and the clip constantly remain substantially in a same angular position (in the vertical plane) in relation to the cable.

In a preferred embodiment of the invention each of the carrier wheels has one cylindrical part of large diameter and one cylindrical part of small diameter, the large and small diameters of one of the wheels being reversed in relation to those of the other wheel, while the bearing rail is of such cross-section that it has two treads on which roll the different parts of the wheels and which are able to be on different levels at certain points, the whole arrangement being such that the line joining the axes of the wheels is substantially parallel with the cable.

Under these conditions the jaws of the coupling clip remain substantially parallel with the cable, so that the latter does not suffer any rough handling.

To ensure proper transversal guidance of the carrier wheels it is of advantage for the rail to have vertical lengthwise guide wings which cooperate with the flanges of the wheels.

According to another improvement intended to keep the clip fully tightened on the cable in the running way of the tackle (even when the cable slopes steeply from the horizontal so that the action of the load on the tightening of the clip is only a function of the cosine of the angle formed by the cable to the horizontal), there is added to the carrier a freewheel device which can be disconnected and is arranged so as to permit of a free closing movement of the clip while the clip cannot open unless the said device is disconnected.

In its preferred embodiments, this improvement is further particularly characterized by the following features and combinations thereof:

The freewheel device is formed by self-tightening braking means enabling a rotation in a direction corresponding to closure of the clip, the brake being released by control means placed at the points where the clip is to be disconnected from the cable.

The self-tightening brake is of the drum and band type and its drum is integral with one of the articulated components of the clip, while at least one of the ends of the band is connected to one arm of a tension lever which swivels on the carrier frame and which, on the one hand, is permanently subjected to the action of elastic means tending to make it swivel in the direction ensuring initial tension of the band and, on the other hand, is connected to control means so arranged as to make it swivel in the direction to release the band, that is to say, to release the brake, the arrangement being such that the drum can rotate normally only in the direction corresponding to the gripping of the clip on the cable and the clip can be loosened only under the effect of an outside force brought to bear on the control means.

The grooved bearer wheels and (or) pressure wheels of the sustaining and guiding parts of the cable (pillars, towers, pylons, etc.) comprise preferably a lining made of rubber or some similar material provided in the groove of said wheels.

It is preferable for at least a part of this lining, when seen in axial cross-section, to have a shape complementary to that of the profile of the part of the clip gripping tightly on the traction cable.

Other special features and characteristics of the invention appear clearly from the following description, which relates to several specimen embodiments of the improvements covered by the said invention, these embodiments being given solely by way of illustration and shown diagrammatically in the accompanying drawings, in which the arrows show the direction of travel of the carrier.

In these drawings:

Fig. 1 is a profile view of a carrier having a clip which grips the cable, and two carrier wheels the rear wheel (the only one visible) being shown resting on a bearing rail in a station; to simplify the drawing, the locking device is not shown;

Fig. 2 is a view at an angle of 90° to Fig. 1, the bearing rail and the clip being omitted to make the drawing clearer;

Fig. 3 is a profile view of the front wheel on the rail (seen in cross-section);

Figs. 4 and 5 are profile views of the rear and front wheels respectively at the beginning of their contact with the bearing rail shown in cross-section;

Figs. 6 and 7 are views similar to those given in Figs. 4 and 5, the wheels being on an intermediate section of rail;

Figs. 8 and 9 are views similar to the preceding ones when the carrier is substantially in the position corresponding to the opening of the clip;

Fig. 10 is a view showing the two wheels at the beginning of their contact with the bearing rail;

Fig. 11 shows the two wheels when the carrier has substantially reached the position corresponding to the opening of the clip;

Fig. 12 is a profile view with partial cross-section of a unit comprising a carrier with its coupling clip and a safety device for the clip, comprising a self-tightening band brake;

Fig. 13 is a view, at an angle of 90° to Fig. 12 of a detail of the unit shown in said Fig. 12;

Fig. 14 is a variation in the detail of the device shown in Fig. 12.

To simplify the explanation it has been assumed that the carrying and traction cable C is horizontal.

The arrangement shown in the drawing comprises a carrier A having a frame 1 on which is articulated a rod B at the lower end of which is suspended the load to be transported. On the frame 1 is mounted a clip for gripping the cable C, said clip having the general design of an articulated parallelogram. Said clip comprises a lever 6 pivoted at 5 on the frame 1 and integral with a tightening jaw 7. Another tightening jaw 8 is integral with a lever 9 articulated at 10 to the lever 6. The levers 6 and 9 form the arms of pliers and when pivoting to each other around the axis 10, the jaws 7 and 8 may grip (or loosen) the cable C. At 11, the lever 9 is articulated to one end of a connecting rod 12, the other end of which is articulated on the frame 1 at 13.

Two spiral springs 14 bear on the frame 1 and tend to raise the rod 12, and thus the articulation 11 to bring about the beginning of the movement of closure of the tightening jaws 7 and 8; this closure becomes effective under the action of the weight of the load carried by the rod B.

At its upper end the jaw carrying lever 9 carries a release control roller 15 which can be lowered by a control check rail 21 provided at each station of the telpher.

In addition, the frame 1 has a front carrier wheel 22 and a rear carrier wheel 23 which both run on a bearing rail 24 at the stations.

According to the invention the wheels 22 and 23 have parts 22a and 23a of small diameter, and parts 22b and 23b of large diameter, the parts 22a, 22b of the wheel 22 being reversed with respect to the parts 23a and 23b of the wheel 23. Moreover, the rail 24 has a tread 24a for the wheel parts 22b and 23a and another tread 24b for the wheel parts 22a and 23b.

The treads 24a and 24b are staggered vertically in relation to each other by an amount which varies according to the different points along the length of the rail 24 and which is such that, when the carrier wheels running on the rail are raised or lowered, the angular position of the carrier (and of the clip mounted on it) in relation to the cable remains practically the same, as can be seen, on the one hand, in Fig. 10 which shows the beginning of the contact of the carrier wheels with the rail (the difference in level between the points of contact of the wheels with the respective treads being shown at D, and, on the other hand, in Fig. 11, which shows the position of the wheels when the carrier is raised to the maximum (clip open).

Although, for greater simplicity, it has been assumed in the drawing that the bearer-traction cable C of the tackle is horizontal, it goes without saying that the operation of the tackle is the same when the cable in question slopes.

Advantageously, there is added to the carrier a freewheel device which can be made out of action and is arranged so as to permit, when in action, a free closing motion of the clip, while the clip cannot open unless the said device is out of action.

Under the effect of shocks, for instance when coupling takes place between the clip and the cable, on departure of the carrier from a station or when the cable passes over bearer wheels (stationary wheels mounted on pylons, towers, etc., along the cableway for carrying the cable) or under pressure wheels (stationary wheels mounted on pylons, towers, etc., for lowering the cable upon a sunken part of the cableway) the clip has a tendency to grip the cable more firmly and this "surplus" grip is maintained by the freewheel device.

When the cable slopes steeply so that the tightening effect of the clip due to the load becomes a function of the cosine of the angle formed by the cable with a horizontal direction, the original grip (cable substantially horizontal) is maintained thanks to the freewheel device.

On leaving the coupling station, the clip is locked in its tightened position, whatever may be the diameter of the cable at the point where the coupling takes place.

A preferred embodiment of a unit improved according to my invention, that is to say a unit comprising wheels with double bearing surfaces and a freewheel device for controlling the grip of the clip is shown on Figs. 12 and 13.

Said unit comprises a carrier A' having a frame 101 to which is pivoted, on a pin 125, secured to the frame, a rod B' to the lower end of which the load to be transported is attached. On the frame 101 is pivoted, on a pin 105 secured to the frame, a lever 106 integral with a gripping jaw 107. Another gripping jaw 108 is integral with a lever 109, articulated by means of an axis 110 to the lever 106. The levers 106 and 109 form the arms of pliers and when pivoting to each other around the axis 110, the jaws 107 and 108 may grip or loosen the cable C. The lever 109 is articulated at 111 to one end of a connecting rod 112 the other end of which is integral with a shaft 113 rotatable in the frame 101. The members 101, 106, 109 and 112 form a pivoted parallelogram.

At its upper end, the jaw lever 109 is integral with an extension carrying an axle which support an idle control roller 115.

Under the action of the weight of the carrier A' (and of the load to be transported), the said carrier is pulled down with respect to the cable C so that the lever 106 tends to pivot clockwise and the jaws 107 and 108 grip the cable C.

The frame 101 has two carrier wheels 122 and 123 similar to the wheels 22 and 23 of Figs. 1 to 11, that is to say wheels having respectively bearing surfaces 122a and 123a of small diameter and bearing surfaces 122b and 123b of large diameter, the parts 122a, 122b of the wheel 122 being reversed with respect to the parts 123a, 123b of the wheel 123. The wheels may run, at stations, on the parts 124a and 124b of a bearing rail 124 similar to the rail 24 (Figs. 3 to 11).

At stations is also provided a control check-rail 121 (similar to the rail 21 of Fig. 1). This rail 121 pushes down the control roller 115. As the carrier is supported, in the stations, by the rail 124, the clip formed by the above mentioned pivoted parallelogram is opened under the action of the pushed down roller 115 and the jaws 106—107 release the cable.

On the shaft 113, integral with the connecting rod 112 is keyed a brake drum 31 on the periphery of which passes a brake band 32 whose two ends are adjustably connected to the two main arms 33a and 33b, of unequal length, of a tension lever 33 swivelling on a pin 34 fixed on the frame 101.

In addition, the tension lever 33 has two auxiliary arms 33c and 33d. One end of a compression spring 35 permanently bears on the arm 33c, and its other end is carried on a support 36 secured to the frame 101.

It will be seen that with this arrangement the drum 31, under the action of the clockwise couple produced by the connecting rod 112 (under the action of the weight of the unit), can rotate in the same direction in the loop of the band 32, thus enabling the clip to grip the cable. The rotation of the drum 31 in opposite direction, on the contrary, is prevented by the self-tightening action of the band 32, said action being produced by the difference of length of the two arms 33a and 33b of the tension lever.

There is therefore no risk that the clip opens accidentally, and experience has shown that, in consequence of the shocks to which the tackle is subjected, for instance when the running parts of the tackle pass over bearer wheels and under pressure wheels, the clip grips more tightly on the cable than it would do under the effect to the load alone.

In order to permit of opening the clip at stations by releasing the brake, the auxiliary arm 33d of the lever 33 is connected through a governor rod 37 to one end of a lever 38 which swivels on a pin 39 secured to the frame 101, the other end of the said lever carrying a wheel 40. A release check-rail (not shown in the drawing) provided at stations pushes down the wheel 40 and causes the lever 38 to swivel anticlockwise, the result being that the tension lever 33 is made to swivel in the clockwise direction, thus releasing the tension of the band 32 to free the drum (with rod 112 integral with said drum) and enable the clip to open.

The bearing rail 124 has, as stated above, two treads 124a and 124b. The treads 124a and 124b are staggered in relation to each other by an amount which varies, along the rail, according to the inclination of the cable at the stations, so that it is possible to control at will the inclination of the carrier with respect to the rail (see Figs. 10 and 12 which illustrate two sections of a bearing rail, and the resulting positions of the wheels— thus of the carrier—with respect to the said rail). In other words, this arrangement permits to adapt the position of the jaws of a carrier clip to the inclination of the cable (at the entrance of a station for example), and to give to the carrier a horizontal position (in the station, when the clip is open).

To ensure less noisy passage of the clip on the bearer wheels and (or) the pressure wheels of the running parts of the tackle, it is advantageous to line these wheels with rubber.

In Fig. 12 is also shown a groove bearer wheel X of a sustaining part of the teleferic, for example a pylon, said wheel comprises, in the groove, a rubber lining 51 which, in axial cross-section, takes on the profile of the clip parts 107 and 108. This lining projects slightly out of the groove on the side turned towards the carrier, so that the clip can only come into contact with the said lining.

In the alternative form, as to details, shown in Fig. 14, the tension lever 33' has only one auxiliary arm 33'd on which the governor rod 37a acts by traction while the spring 135, bearing on a support 36a fixed on the frame, pushes it.

It goes without saying that the specimen embodiments of the improvements in aerial transport tackle described above and shown in the accompanying drawing, have been given merely by way of illustration and are in no way limitative, and that any detail change can be made therein without this entailing a departure from the spirit of the invention.

What I claim is:

1. In a continuous travel telpher for the transport of loads, comprising at least one carrier unit connectable to a traction cable moving between stations, each of which having a fixed bearing rail, said carrier unit comprising: a frame to carry the load to be transported; a coupling clip mounted on the same frame to connect the carrier unit to the said traction cable; and two carrier wheels mounted on the said frame, intended to roll on the fixed bearing rail and placed substantially one behind the other in the direction of travel of the carrier, each of said wheels having two adjacent parts with substantially two cylindrical bearing surfaces of different diameters, the position of the parts of large and of small diameters of one wheel being reversed in relation to the position of the corresponding parts of the other wheel, while the bearing rail has two treads on each of which may roll one of the said parts of the wheels, the relative position of the two treads being such that, at the said stations, the carrier and the coupling clip constantly occupy a substantially invariable position in relation to the cable, in a vertical plane containing said cable.

2. In a carrier unit for continuous travel telpher, connectable to a traction cable and comprising a frame to carry the load to be transported and a clip to couple the frame to the traction cable and constituted by a first lever of which one end is pivoted on the frame and the other end carries a clip jaw, a connecting rod of which one end is pivoted on the frame, and a second lever of which one end is pivoted on the free end of the connecting rod and the other end is pivoted on the first lever and carries a clip jaw so arranged as to grip the traction cable tightly, with the jaw on the first lever, under the action of the weight of the carrier, the provision of a safety device comprising: a brake drum integral in rotation with the connecting rod pivoted on the frame; a tension lever pivotable on the frame; a brake band partially surrounding the said drum and at least one of whose ends is connected to the said tension lever; elastic means connected to the frame and to the lever to make it turn in the direction ensuring the initial tension of the band and control means mounted on the frame and connected to the tension lever to cause it to swivel in the direction ensuring the release of the band, so that the drum can freely rotate only in the direction corresponding to the tightening of the clip on the cable and that the drum can only rotate in the opposite direction, corresponding to the release of the clip, under the action of an external force exerted positively on the control means.

3. A carrier as in claim 2, in which the tension lever comprises two arms of unequal length to the ends of which the ends of the brake band are connected.

4. A carrier as in claim 2, in which the control means comprise: a control lever pivoted on the carrier frame; a pushing member fixed at one end of this control lever; and a traction rod of which one end is connected to the other end of the control lever, its other end being connected to the tension lever.

(References on following page)

References Cited in the file of this patent

UNITED STATES PATENTS

| | | |
|---|---|---|
| 611,570 | Dusedau | Sept. 27, 1898 |
| 805,464 | Hewitt | Nov. 28, 1905 |
| 1,458,921 | Tamamura | June 12, 1923 |
| 1,567,391 | Sackett | Dec. 29, 1925 |
| 1,944,426 | Greening | Jan. 2, 1934 |
| 2,523,107 | Frieder et al. | Sept. 19, 1950 |
| 2,608,161 | Wallmansberger | Aug. 26, 1952 |
| 2,682,838 | Demur | July 6, 1954 |
| 2,806,380 | Martin | Sept. 17, 1957 |

FOREIGN PATENTS

| | | |
|---|---|---|
| 424,991 | France | May 30, 1911 |
| 482,684 | France | Jan. 19, 1917 |
| 228,757 | Germany | Nov. 19, 1910 |
| 234,593 | Germany | May 15, 1911 |
| 309,291 | Germany | Oct. 10, 1919 |
| 42,295 | Sweden | Mar. 20, 1914 |